United States Patent
Crorey

[19]

[11] Patent Number: 6,070,864
[45] Date of Patent: Jun. 6, 2000

[54] ELECTRIC POWER OPERATED POSITIONING APPARATUS

[75] Inventor: David J. Crorey, Clinton Township, Mich.

[73] Assignee: Isi Norgren, Inc., Mt. Clemens, Mich.

[21] Appl. No.: 09/185,431

[22] Filed: Nov. 3, 1998

[51] Int. Cl.[7] ........................................................ B23Q 3/08
[52] U.S. Cl. ................................................................. 269/32
[58] Field of Search .............................. 269/32, 237, 238, 269/239, 24, 25, 27, 228, 93; 74/22 R, 63, 66

[56] References Cited

U.S. PATENT DOCUMENTS

| | | |
|---|---|---|
| 3,147,004 | 9/1964 | Blatt . |
| 3,599,957 | 8/1971 | Blatt . |
| 4,494,739 | 1/1985 | Valentine . |
| 4,620,696 | 11/1986 | Blatt . |
| 4,723,767 | 2/1988 | McPherson et al. . |
| 5,125,632 | 6/1992 | Blatt et al. . |
| 5,171,001 | 12/1992 | Sawdon . |
| 5,575,462 | 11/1996 | Blatt . |
| 5,688,014 | 11/1997 | Kot . |
| 5,762,325 | 6/1998 | Blatt . |

*Primary Examiner*—Robert C. Watson
*Attorney, Agent, or Firm*—Young & Basile, P.C.

[57] ABSTRACT

A workpiece positioning apparatus comprising a housing including opposite side walls defining a hollow therebetween; a motor assembly secured to a housing side wall and including an output shaft; and a rotor. The rotor includes a first journal portion connected to the output shaft and journaled in one of the housing side walls, a second journal portion journaled in the other housing side wall, and a central generally circular disc portion positioned in the hollow of the housing between the housing side walls and defining a bifurcated segment. A pivot shaft is journaled in the housing for rotation about an axis laterally spaced from and parallel to the rotational axis of the output shaft and a driven member is drivingly connected to the pivot shaft, positioned within the housing between the housing side walls, and defines a crank arm. A workpiece engaging member is fixedly mounted on the pivot shaft and is positioned exteriorly of the housing, and a rod assembly is positioned within the housing between the housing side walls. The rod assembly is positioned at one end thereof within the bifurcated segment of the disc portion of the rotor and pivotally connected to the disc portion at a location radially displaced from the output shaft axis. Another end of the rod assembly is pivotally connected to the crank arm, whereby energization of the motor assembly pivots the workpiece engaging member about the axis of the pivot shaft.

12 Claims, 5 Drawing Sheets

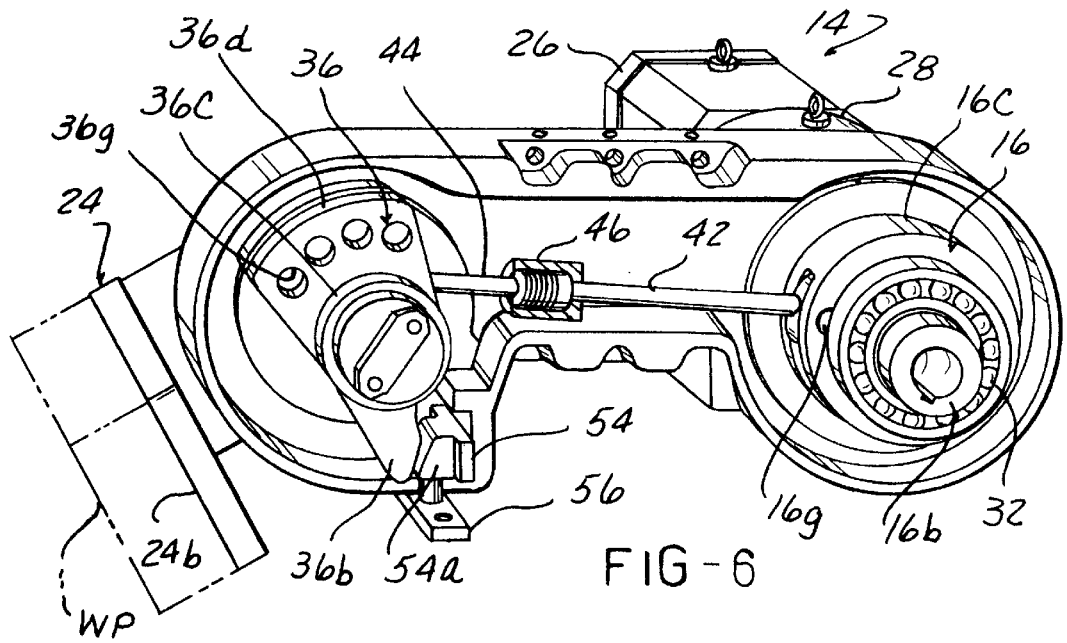
FIG-6
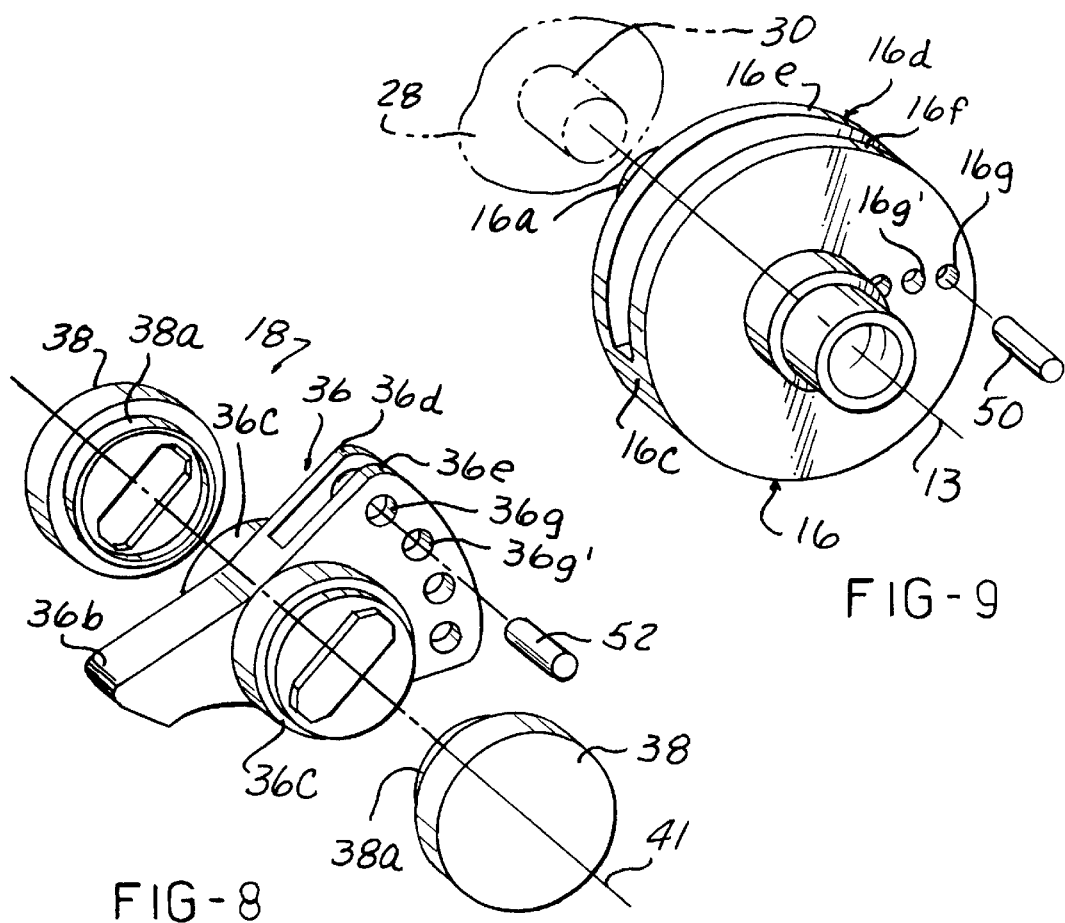
FIG-8
FIG-9

ELECTRIC POWER OPERATED POSITIONING APPARATUS

BACKGROUND OF THE INVENTION

This invention relates to a power operated positioning apparatus for moving and locating a work piece with respect to selected positions.

Various apparatus have been provided for selectively moving workpieces during a machining, welding, or other operation. Most of these apparatuses have incorporated fluid operated actuators such as hydraulic or pneumatic operated piston and cylinder actuators. While these fluid operated actuators are generally satisfactory when moving workpieces with respect to a stationary support, difficulties arise in using actuators of this type in non-stationary support situations such as moving transfer devices, conveyors, shuttles, or the like. In addition, the use of hydraulic fluid in non-stationary applications can be the source of hydraulic fluid leaks while the use of pneumatic actuators increases cost of operation by requiring the production of sufficient quantities of compressed air of predefined quality for operating the apparatuses. Compressed air generally requires the use of fixed or flexible conduits to communicate the compressed air with the actuator and may produce compressed air leaks increasing operating costs. Further, hydraulic and pneumatic actuated workpiece positioning apparatuses require complex control mechanisms to adjust the rate of actuation of the apparatus to eliminate or reduce the amount of shock absorbed as the apparatus reaches a selected position.

In an effort to overcome the noted disadvantages of fluid operated actuators, various forms of workpiece positioning apparatus have been proposed utilizing an electrical power source. However, the prior art electric powered workpiece positioning apparatuses have been unduly complicated and expensive in construction, imprecise in operation, or unreliable in use.

SUMMARY OF THE INVENTION

This invention is directed to the provision of a improved power operated workpiece positioning apparatus.

More specifically, this invention is directed to the provision of an electric powered work positioning apparatus that is simple in construction and economical in manufacture, positive in action, and reliable in operation.

According to the invention, the workpiece positioning apparatus comprises a housing; a motor assembly mounted on the housing and having an output shaft rotational about an output shaft axis; a driving member positioned within the housing, driven by the output shaft, and defining a driving crank arm; means defining a pivot shaft journaled in the housing for rotation about an axis laterally spaced from and parallel to the rotational axis of the output shaft; and a driven member positioned within the housing, drivingly connected to the pivot shaft and defining a driven crank arm; a rod assembly positioned within the housing, pivotally connected at one end thereof to the driving crank arm, and pivotally connected at another end thereof to the driven crank arm; and a workpiece engaging member fixedly mounted on the pivot shaft, positioned exteriorly of the housing, and moveable pivotally in response to actuation of the motor about the rotational axis of the pivot shaft between a working position and a retracted position. This arrangement provides a simple and effective powered apparatus for positioning a workpiece.

According to a further feature of the invention, the apparatus further includes an adjustable stop member mounted on the housing proximate the driven crank arm and the driven member further defines a stop portion for coaction with the stop member to define a limit position of the apparatus. This arrangement provides a simple and effective means for adjusting the limit position of the apparatus.

According to a further feature of the invention, the rod assembly includes a first rod segment connected to the driving crank arm, a second coaxial rod segment connected to the driven crank arm, and a resilient coupling between free ends of the rod segments operative to allow resilient relative axial movement between the rod segments. This arrangement provides a compliant coupling between the driving and driven elements of the apparatus to facilitate compliance of the stop portion with the stop member.

According to a further feature of the invention, the driving crank arm moves through approximately 180° from a start to an end position as the work engaging member moves between its retracted and working positions; and in the start position the longitudinal axis of the rod assembly passes proximate the rotational axis of the output shaft so that the initial angular movement imparted to the driven crank arm and thereby to the work engaging member for each increment of angular movement of the driving crank arm is relatively slight, thereafter increases and maximizes as the driving crank arm moves through 90°, and thereafter decreases and becomes slight again as the driving crank arm approaches its end position and the work engaging member approaches its working position. This specific geometric configuration provides a smooth operation of the apparatus and specifically provides a slow and easy start up movement as the apparatus moves from its start position, quickly moves the apparatus to a position close to its working position, and thereafter provides a soft, gradual arrival at the stop position.

In the disclosed embodiment of the invention, the housing includes opposite side walls defining a hollow therebetween; the motor assembly comprises an electric motor assembly and is secured to a housing side wall and includes an output shaft; the driving member comprises a rotor including a central generally circular disc portion positioned in the hollow of the housing between the housing side walls and defining a bifurcated portion; and the rod assembly is positioned within the housing between the housing side walls and is pivotally positioned at one end thereof within the bifurcated portion of the disc portion of the rotor. This specific arrangement provides a well balanced and positively acting mechanism to positively and precisely position a workpiece.

BRIEF DESCRIPTION OF THE DRAWINGS

FIGS. 5 and 6 are perspective views showing selected operating positions of the apparatus;

FIG. 8 is a detail perspective view of a crank arm assembly utilized in the apparatus;

FIG. 9 is a detail perspective view of a rotor utilized in the apparatus;

DETAILED DESCRIPTION OF THE PREFERRED EMBODIMENT

Figure 1:
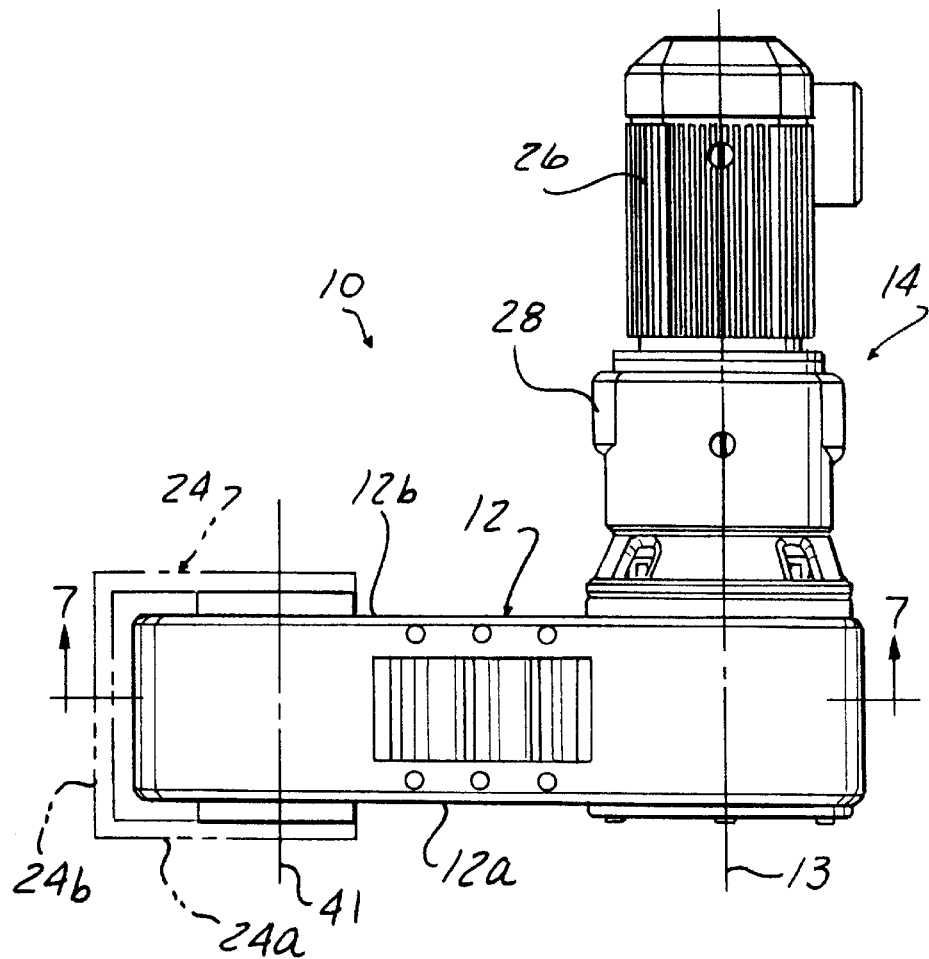
FIG. 1 is a plan view of a positioning apparatus according to the invention.

The positioning apparatus of the invention, broadly considered, includes a housing 12, a motor assembly 14, a rotor 16, a crank arm assembly 18, a connecting rod assembly 20, a stop assembly 22, and a pivot arm or workpiece engaging member 24.

Figure 3:
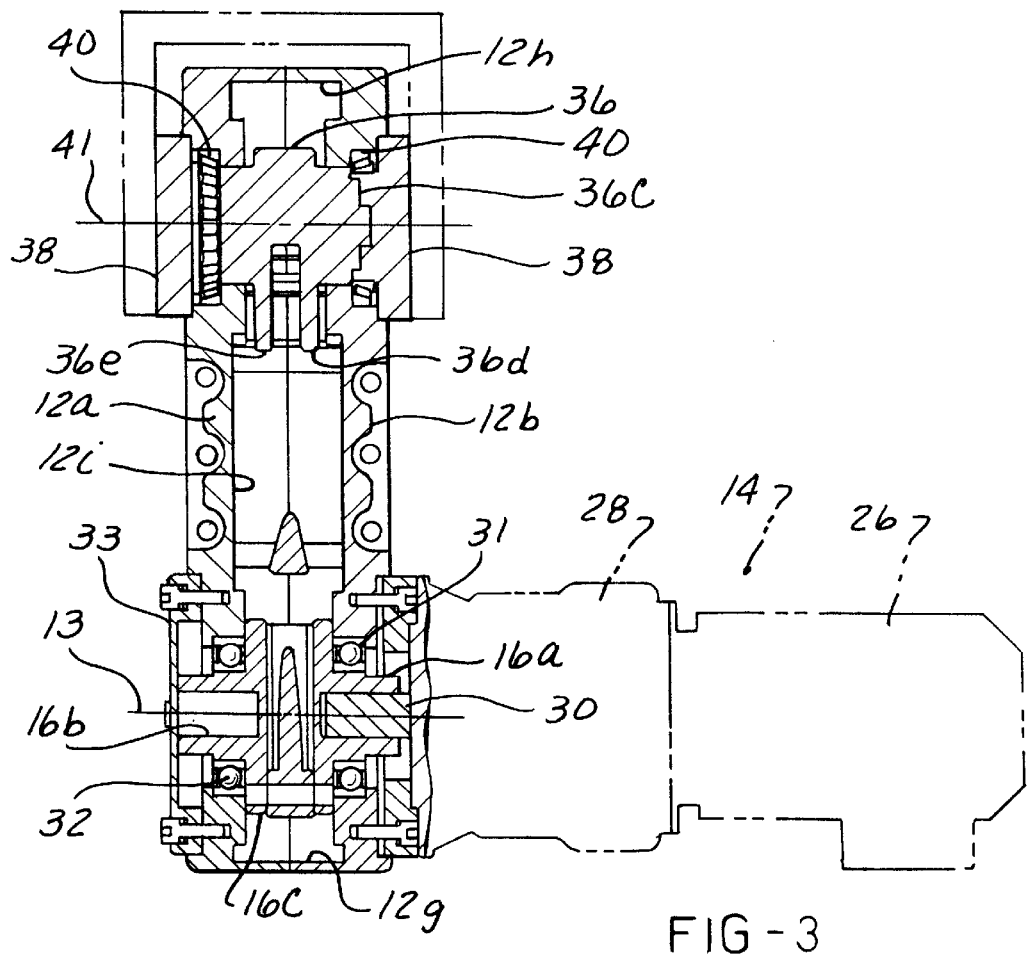
FIG. 3 is a cross sectional view taken on line 3—3 of FIG. 2.

Housing 12 (FIGS. 1, 3, and 7) may be formed of any suitable rigid material and includes side walls 12a and 12b; a top wall 12c; a bottom wall 12d; and arcuate end walls 12e and 12f. The walls coact to define a hollow chamber including a rotor chamber 12g, a crank arm chamber 12h, and a connecting rod chamber 12i.

Figure 2:
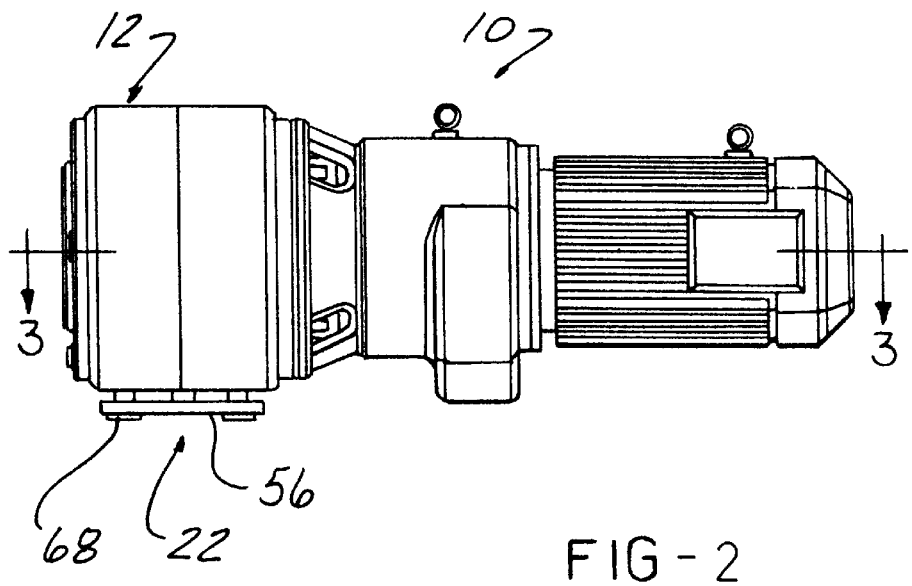
FIG. 2 is an end view of the apparatus.
Figure 4:
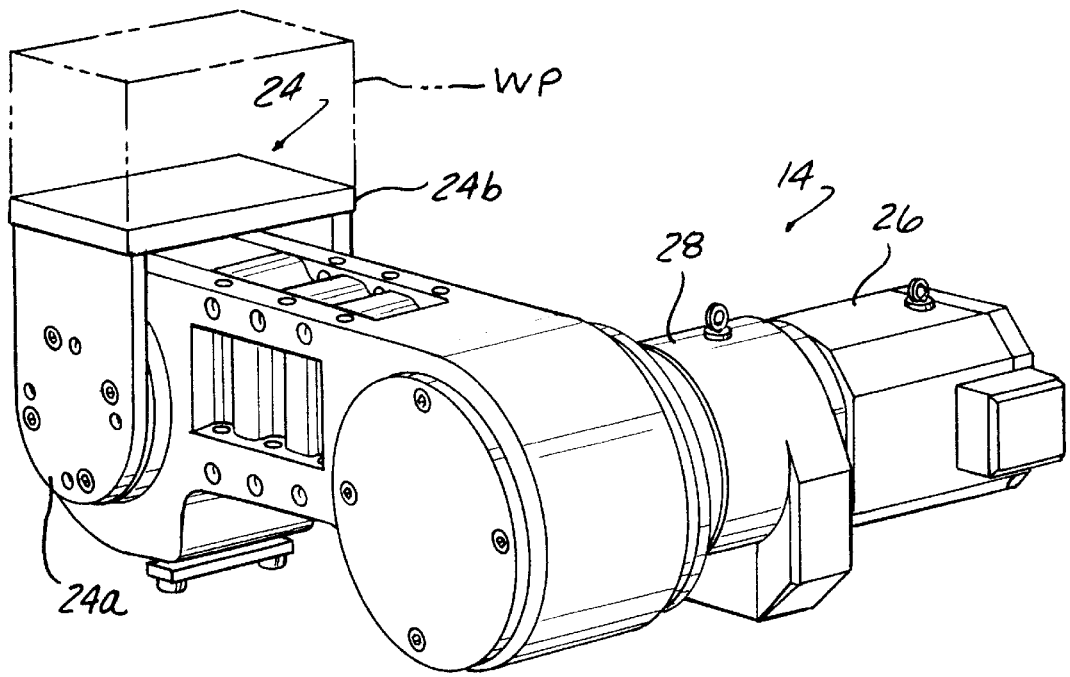
FIG. 4 is a perspective view of the apparatus.

Motor assembly 14 (FIGS. 1, 2, and 4) includes a motor 26 and a gear reducer 28 having an output shaft 30. Motor assembly 14 may comprise for example a foot mount parallel helical gearmotor available from SEW as model R63DT80K4BMHR and having a 0.75 hp rating and an output speed of 23 RPM. Motor assembly 14 is secured to the side wall 12b of housing 12 proximate rotor chamber 12g with the rotational axis 13 of output shaft 30 extending generally normally with respect to housing side walls 12a, 12b and with output shaft 30 extending into rotor chamber 12g.

Figure 7:
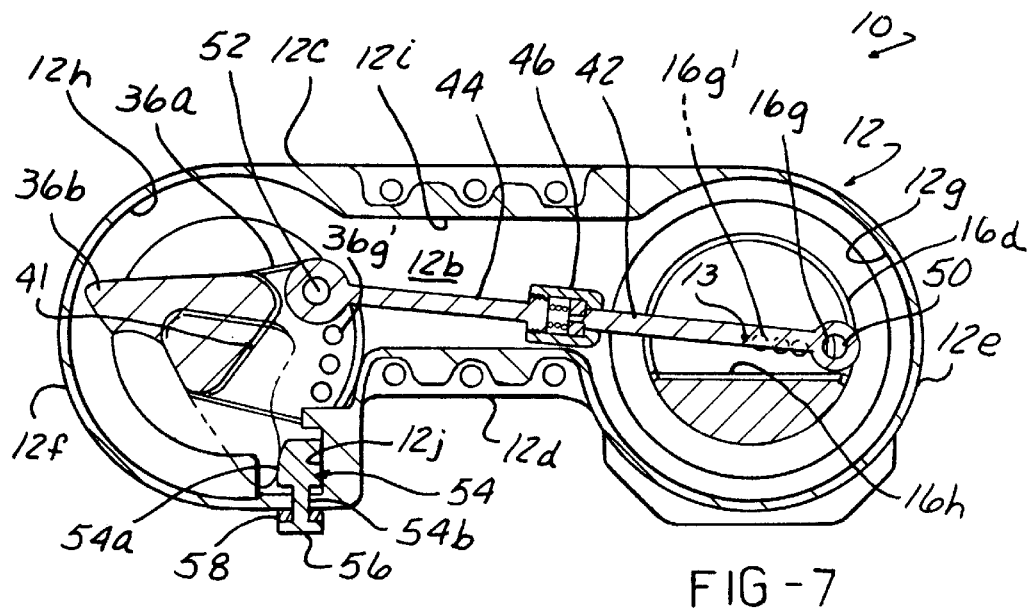
FIG. 7 is a cross sectional view taken on line 7—7 of FIG. 1.

Rotor 16 (FIG. 9) is mounted in rotor chamber 12g and includes a first journal portion 16a fixedly receiving output shaft 30, a second journal portion 16b, and a central, generally circular disc portion 16c positioned in the rotor chamber 12g between housing side walls 12a and 12b and including a bifurcated segment portion 16d including axially spaced segment portions 16e and 16f each delineated by an arcuate surface 16g and a cord 16h. Arcuate surface 16g extends for more than 180° so that cord 16h, as viewed in FIG. 7, is positioned below axis of rotation 13. Rotor journal portion 16a is journaled in housing side wall 12b by a ball bearing 31; rotor journal portion 16b is journaled in housing side wall 12a by a ball bearing 32; and a cover plate 33 is fixedly secured to housing side wall 12a in confronting relation to the end face of rotor journal portion 16b whereby to close rotor chamber 12g.

Crank arm assembly 18 (FIG. 8) includes a crank arm 36, opposite end plates 38, and roller bearings 40.

Crank arm 36 includes a crank arm portion 36a, a tail or stop portion 36b, and opposite hub portions 36c. Crank arm portion 36a is bifurcated and is constituted by axially spaced arm portions 36d and 36e.

End plates 38 are fixedly secured to respective hub portions 36c utilizing coacting keys and key ways provided on the hub portions and the end plates respectively.

Crank arm 36 is rotatably mounted (FIG. 6) in crank arm chamber 12h for rotation about an axis 41 that is laterally spaced from and parallel to the rotational axis 13 of output shaft 30. Roller bearings 40 are positioned on journal portions 38a of end plates 38 and bearings 40 are respectively mounted in housing side walls 12a and 12b to mount the crank arm assembly 18 for rotation about axis 41.

Figure 10:
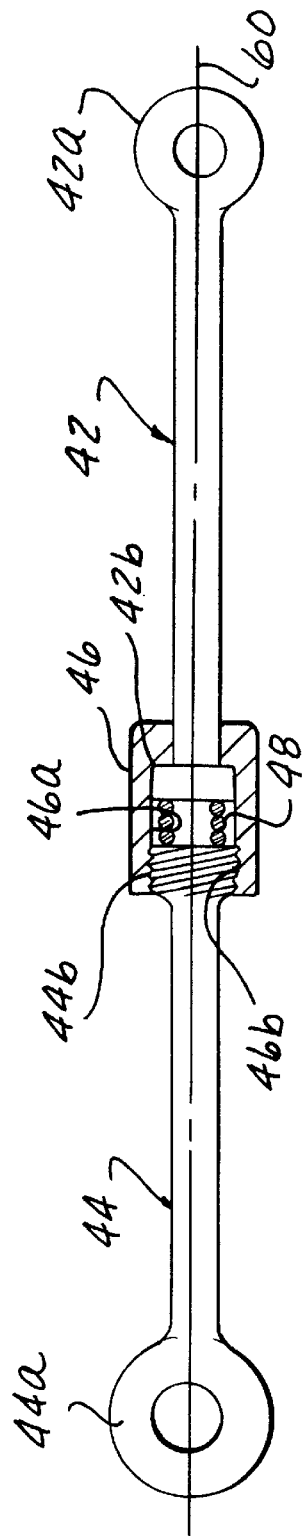
FIG. 10 is a detail perspective view of a coupling utilized in the apparatus.

Rod assembly 20 (FIG. 10) includes a rotor rod 42, a crank arm rod 44, a coupler 46, and a coil spring 48.

Rotor rod 42 includes a journal end 42a and a head end 42b.

Crank arm rod 44 includes a journal end 44a and a threaded end 44b.

Coupler 46 has a generally cylindrical configuration and includes a bore 46a having a threaded end portion 46b to threadably receive threaded end 44b of rod 44 and slidably receives head 42b of rod 42 with spring 48 interposed between heads 44b and 42b.

Figure 5:
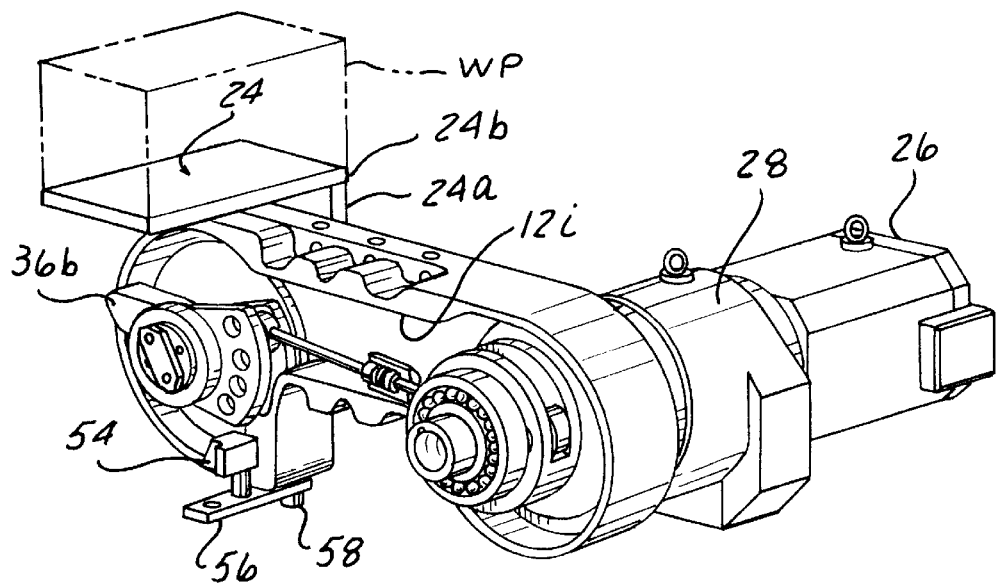

Rod assembly 20 is positioned (FIGS. 5, 6, and 7) in rod chamber 12i with the journal end 42a of rod 42 pivotally mounted in bifurcated segment 16d of rotor 16 and with journal end 44a of rod 44 pivotally mounted in the bifurcated end of crank arm portion 36a. Specifically, a wrist pin 50 is received in aligned bore 16g in rotor portions 16e, 16f, for passage through the journal portion 42a of rod 42 and a wrist pin 52 is received in aligned bores 36g in the bifurcated end of crank arm 36a for passage through the journal portion 42a of rod 44. Bores 16g and wrist pin 50 are defined proximate the periphery of central disc portion 16c at a location radially displaced from output shaft axis 13 whereby to define a crank arm with respect to axis 13.

Stop assembly 22 (FIGS. 2, 4, 5, 6, and 7) includes a stop 54 and fasteners 56. Stop 54 is positioned in crank arm chamber 12h for vertical adjustment in a groove 12j provided in housing 12 proximate crank arm 36. Stop 54 includes a head or cam portion 54a slidably positioned in groove 12j, a stem portion 54b passing downwardly through a suitable aperture in the housing, and an adjuster bar portion 54c. Stop 54 is adjustably positioned relative to the adjacent housing portion by axially spaced fasteners 56 coacting with shims 58. Selection of shims 58 will be seen to vertically adjust cam portion 58a of stop 54 with the cam portion sliding vertically in slot 12j defined by the housing.

Pivot arm or workpiece engaging member 24 has a U-configuration and includes arm portions 24a and a platform or bridge portion 24b. Arm portions 24a are respectively secured to end plates 38 of the crank arm assembly exteriorly of the housing and bridge portion 24b interconnects the free ends of arm portions 24 exteriorly of the housing.

The positioning apparatus of the invention may be utilized to selectively position a workpiece WP in a desired position. When used to position a workpiece the platform portion 24b of the pivot arm 24 includes means for securing a workpiece WP thereto. The positioning apparatus also includes means (not shown) of known form for fastening the work positioning apparatus to a suitable associated stationary or moveable support structure. Motor assembly 14 is selectively energized to move the work positioning apparatus between a first limit position, seen in FIG. 5, wherein, for example, the workpiece is positioned essentially above the housing 12 and a second limit position, seen in FIG. 6, wherein the workpiece is moved to a lowered position relative to the housing with the limit position, seen in FIG. 6, defined by engagement of tail portion 36b of crank arm 36 with the cam or head portion 54a of stop 54. The precise location of the limit position seen in FIG. 6 may be readily adjusted by selective variation of shims 58 to selectively move stop 54 and thereby move the cam face 54a of the stop relative to the coacting cam face of tail member 36b to selectively adjust the limit position. Coupler 46 and spring 48 function to maintain tension in the apparatus during the operation of the apparatus and provide a lost motion, compliant interconnection between the rotor and the crank arm.

Figure 12:
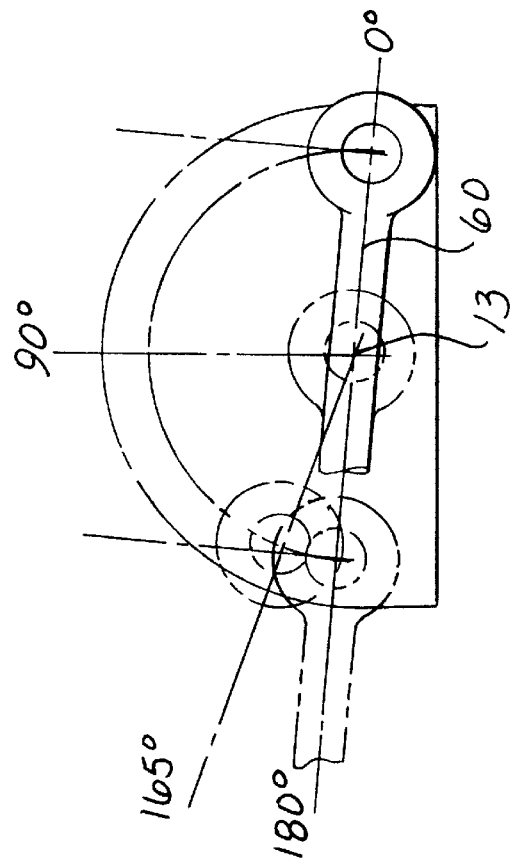
FIG. 12 is a diagrammatic view showing operational aspects of the apparatus.
Figure 11:
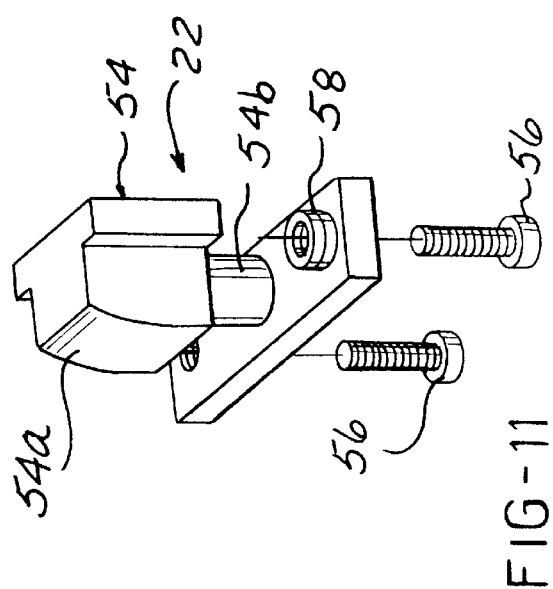
FIG. 11 is a exploded view of a stop assembly utilized in the apparatus.

As seen in FIG. 12, the apparatus is preferably dimensioned such that the driving crank arm defined by the rotor moves through approximately 180° from a start to an end position as the work engaging member moves between its retracted and working positions. In the start position the longitudinal axis 60 of the rod assembly passes proximate the rotational axis 13 of the output shaft so that the initial angular movement imparted to the driven crank arm and thereby to the work engaging member for each increment of angular movement of the driving crank arm is relatively slight, thereafter increases and maximizes as the driving crank arm as defined by the rotor moves through 90°, and thereafter decreases and becomes slight again as the driving crank arm approaches its end position and the work engaging member approaches its working position.

This specific geometric arrangement provides a smooth, soft start-up for the apparatus, a quick intermediate movement of the apparatus, and a soft final approach movement of the apparatus. The crank arm defined by the rotor has a length exceeding the length of the crank arm 36a so that the member 36 moves through something less than 180° as the rotor moves through 180°. As the member 36 approaches its end position corresponding to the working position of the work engaging member, stop portion 36b engages stop 54a to define the working position of the apparatus. The apparatus is preferably set up such that stop portion 36b engages stop 54a at some point before the crank arm defined by the rotor reaches its full 180° of movement whereafter further movement of the crank arm defined by the rotor to its end 180° location is taken up by the resilient give or compliance in the coupling 46. This arrangement insures that the apparatus will always reach its set end position to precisely define the working position of the work engaging member irrespective of tolerances in the system and irrespective of wear in the system. It will be understood that the apparatus will further include limit switches (not shown) which detect and define the start and end positions of the driving crank arm defined by the rotor.

If desired, alternate bore location 16g' (FIG. 9) may be provided at radially spaced locations on the bifurcated segment portion of the rotor and alternate bore locations 36g' may be provided at circumferentially spaced locations in the periphery of the bifurcated segment of crank arm 36a to provide adjustability with respect to the stroke of the apparatus. It will be understood that utilization of an alternate bore location 16g' will be accompanied by utilization of a corresponding alternate bore location 36g'.

The positioning device of the invention will be seen to provide a simple, inexpensive, clean, low-maintenance apparatus for selectively and precisely positioning a work piece for any given desired operation with respect to the work piece.

Whereas a preferred embodiment of the invention has been illustrated and described in detail, it will be apparent that various changes may be made in the disclosed embodiment without departing from the scope or spirit of the invention. For example, although the positioning apparatus of the invention has been described with respect to positioning a workpiece secured to the pivot arm 24, it will be apparent that the positioning apparatus of the invention may also be employed in a manner wherein the pivot arm 24 acts in a clamping fashion with respect to an associated workpiece.

It is claimed:

1. A workpiece positioning apparatus comprising:
   a housing;
   a motor assembly mounted on the housing and having an output shaft rotational about an output shaft axis;
   a driving member positioned within the housing, driven by the output shaft, and defining a driving crank arm;
   means defining a pivot shaft journaled in the housing for rotation about an axis laterally spaced from and parallel to the rotational axis of the output shaft;
   a driven member positioned within the housing, drivingly connected to the pivot shaft, and defining a driven crank arm;
   a rod assembly positioned within the housing, pivotally connected at one end thereof to the driving crank arm, and pivotally connected at another end thereof to the driven crank arm; and
   a workpiece engaging member fixedly mounted on the pivot shaft, positioned exteriorly of the housing, and movable pivotally in response to actuation of the motor about the rotational axis of the pivot shaft between a working position and a retracted position.

2. A workpiece positioning apparatus according to claim 1 wherein:
   the apparatus further includes an adjustable stop member mounted on the housing proximate the driven crank arm; and
   the driven member further defines a stop portion for coaction with the stop member to define the working position of the work engaging member.

3. A workpiece positioning apparatus according to claim 2 wherein the rod assembly includes a first rod segment connected to the driving crank arm, a second coaxial rod segment connected to the driven crank arm, and a resilient coupling between free ends of the rod segments operative to allow resilient relative axial movement between the rod segments to provide compliance between the stop portion and the stop member as the work engager member approaches its working position.

4. A workpiece positioning apparatus according to claim 1 wherein:
   the driving crank arm moves through approximately 180° from a start to an end position as the work engaging member moves between its retracted and working positions; and
   in the start position the longitudinal axis of the rod assembly passes proximate the rotational axis of the output shaft so that the initial angular movement imparted to the driven crank arm and thereby to the work engaging member for each increment of angular movement of the driving crank arm is relatively slight, thereafter increases and maximizes as the driving crank arm moves through 90°, and thereafter decreases and becomes slight again as the driving crank arm approaches its end position and the work engaging member approaches its working position.

5. A workpiece positioning apparatus according to claim 4 wherein:
   the apparatus further includes an adjustable stop member mounted on the housing proximate the driven crank arm; and
   the driven member further defines a stop portion for coaction with the stop member to define the working position of the work engaging member.

6. A workpiece positioning apparatus according to claim 5 wherein the rod assembly includes a first rod segment connected to the driving crank arm, a second coaxial rod segment connected to the driven crank arm, and a resilient coupling between free ends of the rod segments operative to allow resilient relative axial movement between the rod segments to provide compliance between the stop portion and the stop member as the work engaging member approaches the working position.

7. A workpiece positioning apparatus according to claim 6 wherein the motor comprises an electric motor assembly.

8. A workpiece positioning apparatus comprising;
   a housing including opposite side walls defining a hollow therebetween;
   an electric motor assembly secured to a housing side wall and including an output shaft rotational about an output shaft axis;
   a rotor positioned in the hollow of the housing between the housing side walls and driven by the output shaft;
   means defining a pivot shaft journaled in the housing for rotation about an axis laterally spaced from and parallel to the rotational axis of the output shaft;
   a crank arm drivingly connected to the pivot shaft and positioned within the housing between the housing side walls;
   a rod assembly positioned within the housing between the housing side walls, pivotally connected at one end thereof to the rotor at a location displaced from the output shaft axis, and pivotally connected at another end thereof to a free end of the crank arm; and
   a workpiece engaging member fixedly mounted on the pivot shaft, positioned exteriorly of the housing, and movable pivotally in response to energization of the motor about the rotational axis of the pivot shaft between a working position and a retracted position.

9. A workpiece engaging member according to claim 8 wherein:
   the apparatus further includes an adjustable stop member mounted on the housing opposite the crank arm; and
   the driven member further defines a stop portion for coaction with the stop member to define the working position of the work engaging member.

10. A workpiece positioning apparatus according to claim 9 wherein the rod assembly includes a first rod segment connected to the rotor, a second coaxial rod segment connected to the crank arm, and a resilient coupling between free ends of the rod segments operative to allow resilient relative axial movement between the rod segments to provide compliance between the stop portion and the stop member as the work engaging member approaches its working position.

11. A workpiece positioning apparatus according to claim 8 wherein:
   the rotor includes a bifurcated portion; and
   the one end of the rod assembly is positioned within the bifurcated portion of the rotor.

12. A workpiece positioning apparatus according to claim 10 wherein:
   the rotor moves through approximately 180° from a start to an end position as the work engaging member moves between its retracted and working positions; and
   in the start position the longitudinal axis of the rod assembly passes proximate the rotational axis of the output shaft so that the initial angular movement imparted to the crank arm and thereby to the work engaging member for each increment of angular movement of the rotor is relatively slight, thereafter increases and maximizes as the rotor moves through 90°, and thereafter decreases and becomes slight again as the rotor approaches its end position and the work engaging member approaches it working position.

* * * * *